United States Patent
Zhao et al.

(10) Patent No.: US 12,194,981 B2
(45) Date of Patent: Jan. 14, 2025

(54) METHOD AND SYSTEM FOR ADJUSTING A MINIMUM DRIVER DEMAND WHEEL TORQUE

(71) Applicant: Ford Global Technologies, LLC, Dearborn, MI (US)

(72) Inventors: Yanan Zhao, Ann Arbor, MI (US); Jason Meyer, Canton, MI (US); Rajit Johri, San Francisco, CA (US); Mark Steven Yamazaki, Canton, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/310,432

(22) Filed: May 1, 2023

(65) Prior Publication Data
US 2023/0264676 A1  Aug. 24, 2023

Related U.S. Application Data

(62) Division of application No. 16/922,165, filed on Jul. 7, 2020, now Pat. No. 11,679,751.

(51) Int. Cl.
*B60W 20/10*  (2016.01)
*B60W 10/06*  (2006.01)
*B60W 10/08*  (2006.01)
*B60W 30/18*  (2012.01)
*B60W 50/00*  (2006.01)

(52) U.S. Cl.
CPC .......... *B60W 20/10* (2013.01); *B60W 10/06* (2013.01); *B60W 10/08* (2013.01); *B60W 30/18063* (2013.01); *B60W 30/18072* (2013.01); *B60W 2050/0026* (2013.01); *B60W 2510/0642* (2013.01); *B60W 2510/1005* (2013.01); *B60W 2520/10* (2013.01); *B60W 2520/30* (2013.01); *B60W 2540/10* (2013.01); *B60W 2720/30* (2013.01)

(58) Field of Classification Search
CPC ...... B60W 20/10; B60W 10/06; B60W 10/08; B60W 30/18063; B60W 30/18072; B60W 2050/0026; B60W 2510/0642; B60W 2510/1005; B60W 2520/10; B60W 2520/30; B60W 2540/10; B60W 2720/30; B60W 2050/0096; B60W 40/12
See application file for complete search history.

(56) References Cited

U.S. PATENT DOCUMENTS

| | | |
|---|---|---|
| 6,068,574 A | 5/2000 | Wild et al. |
| 9,796,385 B2 | 10/2017 | Krueger et al. |
| 2015/0111693 A1* | 4/2015 | Wang ............. B60W 30/18063 180/65.265 |
| 2016/0031442 A1 | 2/2016 | Brockley et al. |

FOREIGN PATENT DOCUMENTS

GB      2590962 A      7/2021

* cited by examiner

*Primary Examiner* — Brian P Sweeney
(74) *Attorney, Agent, or Firm* — David Kelley; McCoy Russell LLP

(57) ABSTRACT

Methods and systems are provided for adjusting driver demand wheel torque of a vehicle. The driver demand wheel torque may be adjusted as a function of a minimum wheel torque. The minimum wheel torque may be determined according to a plurality of torques that may be evaluated in three different phases.

6 Claims, 4 Drawing Sheets

METHOD AND SYSTEM FOR ADJUSTING A MINIMUM DRIVER DEMAND WHEEL TORQUE

CROSS REFERENCE TO RELATED APPLICATIONS

The present application is a divisional of U.S. Non-Provisional patent Application Ser. No. 16/922,165, entitled "METHOD AND SYSTEM FOR ADJUSTING A MINIMUM DRIVER DEMAND WHEEL TORQUE", and filed on Jul. 7, 2020. The entire contents of the above-listed application are hereby incorporated by reference for all purposes.

FIELD

The present application relates to methods and systems for adjusting a driver demand wheel torque of a vehicle.

BACKGROUND/SUMMARY

A driver demand wheel torque is a torque that is requested at a vehicle's wheels. The driver demand wheel torque may be based on input from a propulsion pedal, lever, mechanism, human/machine interface, or an autonomous driver.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
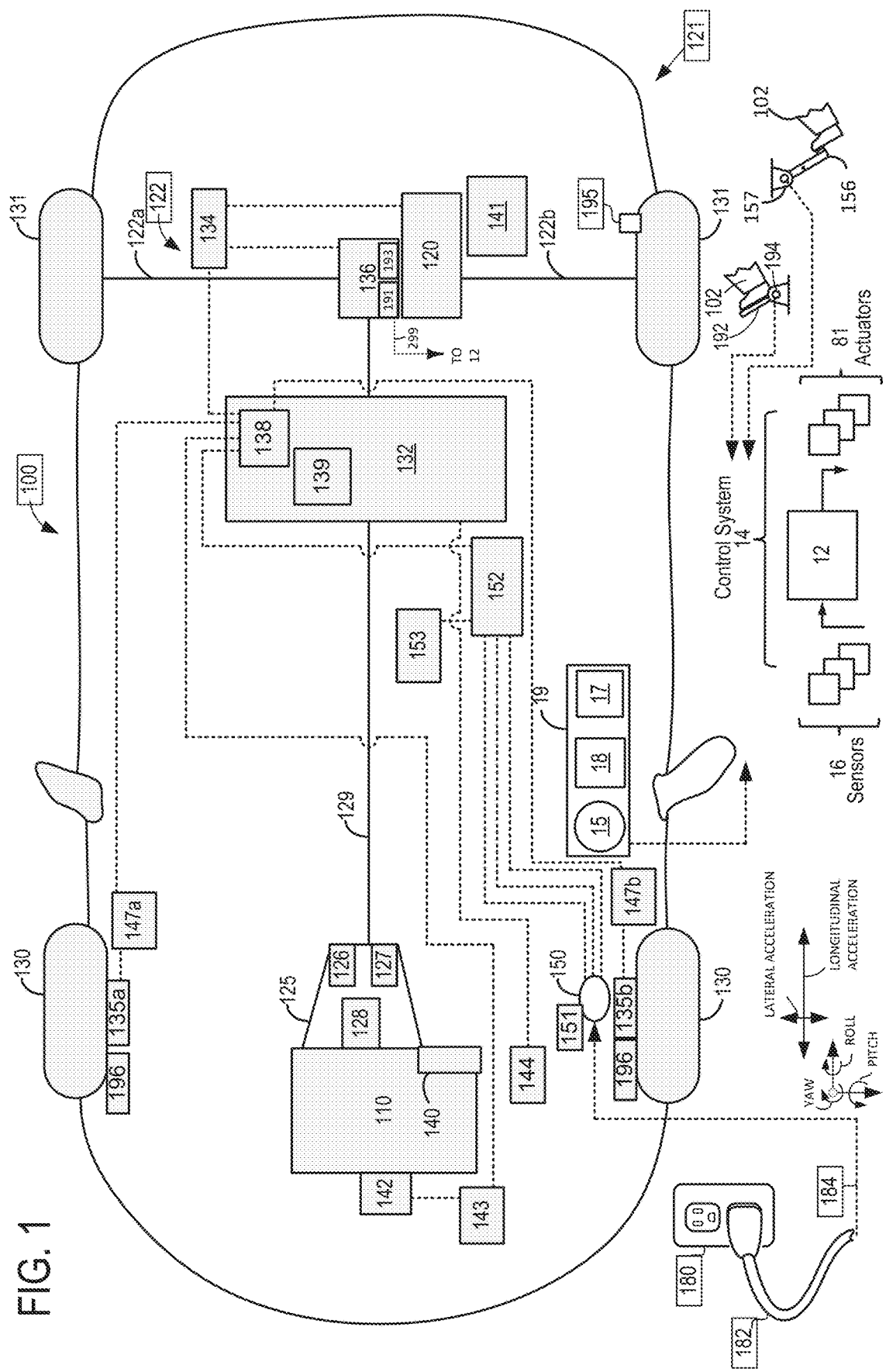
FIG. 1 shows a schematic depiction of an engine system of a vehicle.
Figure 3:
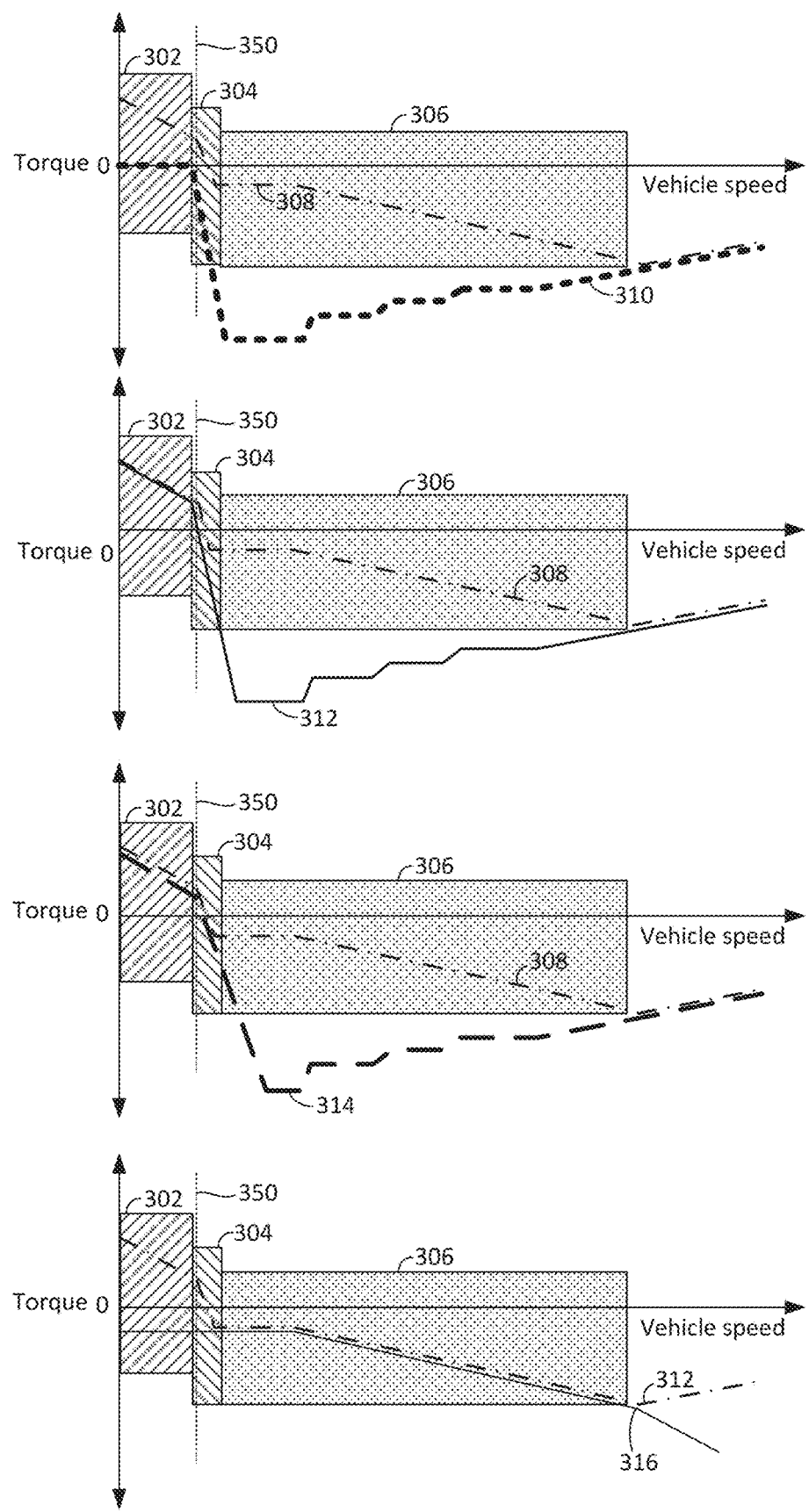
FIG. 3 shows an example vehicle operating sequence where a minimum requested wheel torque is determined according to several contributing torques.

The following description relates to systems and methods for operating a vehicle. The vehicle may include an internal combustion engine and/or an electric machine to provide propulsive force to the vehicle. The vehicle powertrain may be of the type that is shown in FIG. 1 or other known configurations. Wheel torque for the vehicle may be determined according to a relationship between mapped driver demand torque and a driver demand wheel torque request. The mapped driver demand torque may be determined from a position of a driver demand wheel torque input device (e.g., a propulsion pedal, lever, human/machine interface, or an autonomous driver) and vehicle speed. The relationship between a mapped driver demand wheel torque and a driver demand wheel torque request may include a breakpoint that represents a minimum requested wheel torque. The minimum requested wheel torque may be determined from several torque values as shown in FIG. 3 so that vehicle drivability may meet expectations. A method for determining and generating a minimum wheel torque request is provided in FIG. 4.

The mapped driver demand wheel torque may be generated according to propulsion pedal position or a position or state of another device (e.g., a lever or an autonomous driver). The mapped driver demand wheel torque may vary from a minimum wheel torque to a maximum wheel torque. However, it may not be desirable to leave the minimum wheel torque as a single value because a single value may not be suitable for all driving conditions. For example, when a vehicle's driver releases a propulsion pedal and the vehicle is coasting, it may be desirable to generate a minimum wheel torque request that is negative so that the vehicle may be slowed at a desired rate. On the other hand, if the vehicle is stopped and the driver releases the propulsion pedal, it may be desirable to generate a small positive wheel torque. Thus, a single value minimum wheel torque request may not be desirable during all vehicle operating conditions.

The inventors herein have recognized that desirable vehicle drivability may be achieved via a method for operating a vehicle, comprising: selecting a minimum wheel torque from a plurality of torques; including the minimum wheel torque in a relationship between a mapped driver demand wheel torque input and a driver demand wheel torque request; and adjusting torque of a powertrain propulsion source as a function of the relationship between the mapped driver demand wheel torque and the driver demand wheel torque request.

By selecting a minimum wheel torque from a plurality of torques, it may be possible to provide the technical result of improving vehicle drivability when a vehicle's driver releases a propulsion pedal under different driving conditions. In one example, the minimum wheel torque request may be selected from a vehicle coasting drivability torque, a powertrain capability minimum wheel torque, a creep wheel torque, and a smooth transition wheel torque.

The present description may provide several advantages. In particular, the approach may be useful for providing minimum wheel torque values for a variety of different driveline configurations. Further, the approach may improve vehicle drivability. In addition, the approach may improve vehicle operation when the propulsion pedal transitions from an unapplied state to an applied state.

Turning now to the figures, FIG. 1 illustrates an example vehicle propulsion system 100 for vehicle 121. Vehicle propulsion system 100 may include at least two propulsion sources including an internal combustion engine 110 and an electric machine 120. However, in some examples, vehicle propulsion system 100 may include only electric machine 120, or alternatively, a plurality of electric machines that operate as vehicle propulsion sources. The methods described herein may apply when vehicle propulsion system 100 is configured as a hybrid vehicle, electric vehicle, or conventional internal combustion engine based vehicle.

Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. In this example, front wheels 130 are not driven and rear wheels 131 are driven electrically or via engine 110. However, in other examples, front wheels 130 may be driven via an electric machine. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set, differential 193, and an electrically controlled differential clutch 191 that adjusts torque transfer to axle 122a and to axle 122b. In some examples, electrically controlled differential clutch 191 may communicate a clutch torque capacity (e.g., an amount of torque the clutch may transfer and it may increase in response to an increasing force applied to close the clutch) of the electrically controlled differential clutch via CAN bus 299. Torque transfer to axle 122a and 122b may be equal when electrically controlled differential clutch is open. Torque transfer to axle 122a may be different from torque transferred to axle 122b when electrically controlled differential clutch 191 is partially closed (e.g., slipping such that speed input to the clutch is different than speed output of the clutch) or closed. Rear drivel unit 136 may also include one or more clutches (not shown) to decouple transmission 125 and electric machine 120 from wheels 131. Rear drive unit 136 may be directly coupled to electric machine 120 and axle 122. In some examples, a motor positioned directly downstream of transmission 125 in the direction of positive torque flow from the engine 110 may be substituted for rear drive unit 136.

A transmission 125 is illustrated in FIG. 1 as connected between engine 110, and electric machine 120 assigned to rear axle 122. In one example, transmission 125 is an automatic transmission that includes a torque converter 128. Transmission 125 may shift gears by selectively opening first clutch 126 and closing second clutch 127. Transmission 125 may include a plurality of clutches and gears.

Electric machine 120 may receive electrical power from onboard electrical energy storage device 132. Furthermore, electric machine 120 may provide a generator function to convert engine output or the vehicle's kinetic energy into electrical energy, where the electrical energy may be stored at electric energy storage device 132 for later use by the electric machine 120 or integrated starter/generator 142. A first inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to a propulsion pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter/generator (BISG) 142. BISG may produce electric power when the engine 110 is in operation, where the electrical power produced may be used to supply electric devices and/or to charge the onboard storage device 132. As indicated in FIG. 1, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

In some examples, vehicle propulsion system 100 may include one or more electric machines 135a and 135b to propel vehicle 121 or to provide regenerative braking via front wheels 130. Friction brakes 196 may be applied to slow front wheels 130. Third inverter (ISC3) 147a may convert alternating current generated by electric machine 135a to direct current for storage at the electric energy storage device 132 or provide alternating current to electric machine 135a to propel vehicle 121. Likewise, fourth inverter (ISC4) 147a may convert alternating current generated by electric machine 135b to direct current for storage at the electric energy storage device 132 or provide alternating current to electric machine 135b to propel vehicle 121. Electric machines 135a and 135b may be collectively referred to as front wheel electric machines.

Vehicle propulsion system 100 may further include a power distribution box (PDB) 144. PDB 144 may be used for routing electrical power throughout various circuits and accessories in the vehicle's electrical system.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 130) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Thus, the system of FIG. 1 provides for a system for operating a powertrain, comprising: one or more propulsion sources; and a controller including executable instructions stored in non-transitory memory that cause the controller to adjust a torque of the propulsion source in response to a minimum wheel torque request, where the minimum wheel torque request is a greater of a vehicle coasting drivability wheel torque, a powertrain capability minimum wheel torque, a smooth transition wheel torque, and a creep wheel torque. The system includes where the one or more propulsion sources include an internal combustion engine. The system includes where the one or more propulsion sources include an electric machine. The system further comprising additional instructions to determine the creep wheel torque based on a torque converter characteristic. The system includes where the smooth transition wheel torque is based on a past value of the minimum wheel torque request and a controlled calibratable wheel torque change rate. The system includes where the powertrain minimum wheel torque is zero for vehicle speeds less than a vehicle creep speed minus an offset vehicle speed, it is the actual powertrain minimum capability from all propulsion source projected to the wheel for vehicle speed greater than a vehicle creep speed minus an offset vehicle speed. The system includes where the vehicle coasting drivability wheel torque is based on transmission gear ratio, vehicle speed, and selected drive mode.

Figure 2:
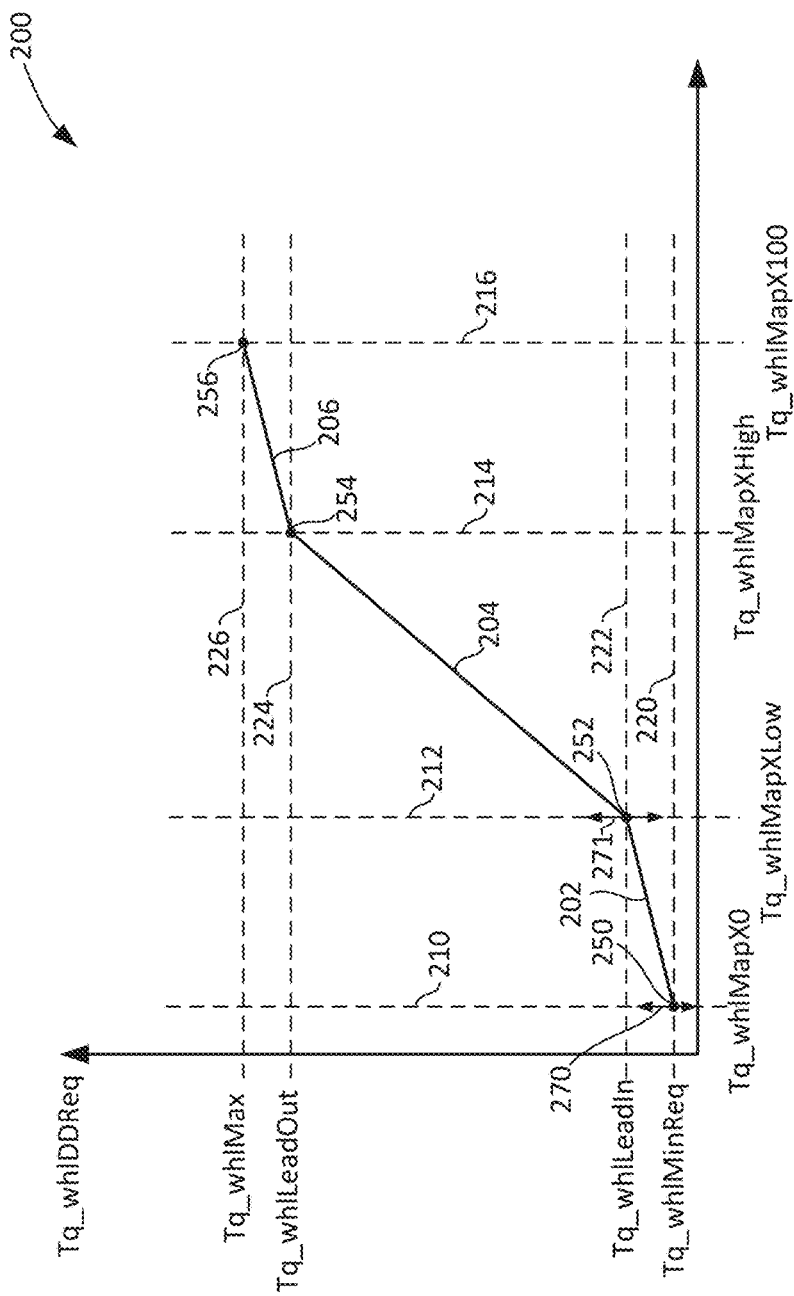
FIG. 2 shows a plot of an example relationship between a mapped driver demand torque and a driver demand wheel torque request.

FIG. 2 shows an example relationship between a mapped driver demand wheel torque and a driver demand wheel torque request. The mapped driver demand wheel torque may be determined from an input device (e.g., a propulsion pedal, lever, human/machine interface, or an autonomous driver) and vehicle speed. The horizontal axis represents a mapped driver demand wheel torque. The driver demand wheel torque input device is in a base position, or not applied, where the horizontal axis is intersected by vertical line 210. The driver demand wheel torque input device is in a fully applied position where the horizontal line is intersected by line 216. Thus, the driver demand wheel torque input device is not applied at the left side of the horizontal axis, and the application amount of the driver demand wheel torque input device increases to the right side of plot 200. The vertical axis represents the driver demand wheel torque request, and the amount of the driver demand wheel torque request increases in the direction of the vertical axis arrow.

The mapped driver demand wheel torque input to requested driver demand wheel torque relationship is represented by line segments 202, 204, and 206. Line 202 may be referred to as a lead-in line segment of the mapped driver demand wheel torque input to driver demand wheel torque request relationship because it starts from the base or unapplied driver demand wheel torque input device base position. Line 204 may be referred to as a middle line segment of the mapped driver demand wheel torque input to driver demand wheel torque request relationship. Line 206 may be referred to as a lead-out line segment of the mapped driver demand wheel torque input to driver demand wheel requested torque relationship because line segment 206 ends with the driver demand wheel torque input device being fully applied.

A first breakpoint 250 defines a first end of lead-in line segment 202. Second breakpoint 252 defines a second end of lead-in line segment 202 and a first end of middle line segment line segment 204. Third breakpoint 254 defines a second end of middle line segment line segment 204 and a first end of lead-out line segment 206. The other end of lead-out line segment 206 is defined by fourth breakpoint 256. Breakpoint 250 may be dynamically adjusted with respect to the vertical axis (e.g., the driver demand wheel torque request) in response to vehicle operating conditions as discussed in further detail with respect to method 400.

The first breakpoint 250 is shown at the intersection of vertical line 210 and horizontal line 220. Vertical line 210 represents the base or not applied position of the mapped driver demand wheel torque input. Vertical line 210 also represents a beginning or first side of a lead-in region for the mapped driver demand wheel torque input that extends between vertical line 210 and vertical line 212. Horizontal line 220 represents the minimum wheel torque request (e.g., the wheel torque request may not be less than the value of the minimum wheel torque request). The minimum wheel torque request Tq_whlMinReq may be adjusted in the direction indicated by arrows 270 according to vehicle operating conditions as discussed in greater detail in the description of FIG. 4.

The second breakpoint 252 is shown at the intersection of vertical line 212 and horizontal line 222. Vertical line 212 represents the end of the lead-in region of the mapped driver demand wheel torque input. Vertical line 212 also represents a beginning of the middle line segment region of the mapped driver demand wheel torque input that extends to vertical line 214. Horizontal line 222 represents the maximum wheel torque request of the lead-in region. The maximum torque for the lead-in region Tq_whlLeadIn may be adjusted in the direction of the arrows 271 according to vehicle operating conditions as discussed in greater detail in the description of FIG. 4.

The third breakpoint 254 is shown at the intersection of vertical line 214 and horizontal line 224. Vertical line 214 represents the end of the middle line segment region of the mapped driver demand wheel torque input. Vertical line 214 also represents a beginning of the lead-out region of the mapped driver demand wheel torque input that extends to vertical line 216. Horizontal line 224 represents the maximum wheel torque request of the middle line segment region and the minimum wheel torque of the lead-out region.

The fourth breakpoint 256 is shown at the intersection of vertical line 216 and horizontal line 226. Vertical line 216 represents the fully applied position of the mapped driver demand wheel torque input. Vertical line 216 also represents the end of the lead-out region for the mapped driver demand wheel torque input. Horizontal line 226 represents the maximum wheel torque request (e.g., the wheel torque request may not be greater than the value of the maximum wheel torque request).

The lead-in line portion of the relationship between a mapped driver demand wheel torque input and a commanded or requested driver demand wheel torque (e.g., line 202) provides a gradual increase in requested driver demand wheel torque for an increase in the application amount of the mapped driver demand wheel torque input. The slope of the line segment 202 may be increased or decreased in response to vehicle operating conditions so that "dead pedal" feel may be avoided. The slope of line segment 202 may be changed via adjusting the value of Tq_whlLeadIn or the value of Tq_whlMinReq dynamically as a function of vehicle operating conditions. Tq_whlMapXO represents the mapped driver demand input at fully released position of the driver demand wheel torque input device and Tq_whlMapXLow is the mapped driver demand input at the position of the driver demand wheel torque input device at which the lead-in region stops (e.g., 10% of a fully applied driver demand wheel torque input device). In one example, Tq_whlMapXLow=Tq_whlXRL, or the mapped driver demand input at position of the driver demand wheel torque input device at which the lead-in region stops is equal to the mapped driver demand input at road load of the vehicle (Tq_whlXRL). Thus, the lead-in line portion and the lead-out line portion have lower gains (e.g., rates of change of driver demand torque request as a function of mapped driver demand torque) than the middle line section.

Referring now to FIG. 3, plots of torques that contribute to a minimum wheel torque request are shown. The torques trajectories of FIG. 3 are shown relative to three phases that are a function of vehicle speed.

The first plot from the top of FIG. 3 is a plot of minimum wheel torque request and powertrain capable minimum wheel torque versus vehicle speed. The powertrain capable minimum wheel torque is a minimum powertrain torque that may be commanded and generated at the vehicle's wheels. Line 308 represents the minimum wheel torque request. Line 310 represents the powertrain capable minimum wheel torque. Vertical line 350 represents a creep speed of a vehicle. The creep speed may be a speed of the vehicle on a flat road achieved after the vehicle was stopped and after the brake pedal has been released with no propulsion pedal application when the vehicle reaches an equilibrium point where the road load is balanced by the torque converter's positive torque output for a vehicle with automatic transmission. Shaded area 302 represents a first phase or a creep phase where vehicle speed is lower than the creep speed and the propulsion pedal is fully released. The creep phase is active when vehicle speed is less than or equal to creep speed at line 350. Shaded area 304 represents a second phase or transition phase between the creep phase and a coasting phase. The transition phase is active when vehicle speed is greater than the creep speed at line 350 and less than the creep speed at line 350 plus a first vehicle speed offset value. Shaded area 306 represents a third phase or coasting phase. The coasting phase is active when vehicle speed is greater than the creep speed at line 350 plus the first offset vehicle speed.

The second plot from the top of FIG. 3 is a plot of minimum wheel torque request and creep wheel torque request versus vehicle speed. The creep wheel torque is a torque that propels the vehicle at a predetermined constant speed (e.g., 9 Kilometers/hour) on a flat road after the vehicle was stopped and the vehicle's brake was released without applying the propulsion pedal. Lines and phases numbered in the second plot with the same numbers as lines and phases numbered in the first plot are indicated with same numbers. For example, line 308 in second plot from the top of FIG. 3 and line 308 in the first plot from the top of FIG. 3 both represent the minimum wheel torque request. Therefore, for the sake of brevity their description is omitted. Line 312 represents the creep wheel torque request.

The third plot from the top of FIG. 3 is a plot of minimum wheel torque request and smooth transition wheel torque versus vehicle speed. The smooth transition wheel torque is a torque that controls the torque transition from creep wheel torque to coasting wheel torque. Lines and phases numbered in the third plot with the same numbers as lines and phases numbered in the first plot are indicated with same numbers. For example, line 308 in third plot from the top of FIG. 3 and line 308 in the first plot from the top of FIG. 3 both represent the minimum wheel torque request. Therefore, for the sake of brevity their description is omitted. Line 314 represents the smooth transition wheel torque.

The fourth plot from the top of FIG. 3 is a plot of minimum wheel torque request and vehicle coasting drivability wheel torque versus vehicle speed. The vehicle coasting drivability wheel torque is a torque that controls vehicle deceleration when the vehicle is coasting. Lines and phases numbered in the fourth plot with the same numbers as lines and phases are numbered in the first plot are indicated with same numbers. For example, line 308 in fourth plot from the top of FIG. 3 and line 308 in the first plot from the top of FIG. 3 both represent the minimum wheel torque request. Therefore, for the sake of brevity their description is omitted. Line 316 represents the vehicle coasting drivability wheel torque.

In the first phase 302, vehicle speed is less than or equal to the vehicle creep speed. During the first phase, the creep wheel torque request as shown in the second plot from the top of FIG. 3 is greater than the powertrain capable minimum wheel torque 310, the smooth transition wheel torque 312, and the vehicle coasting wheel torque 316. The powertrain capable minimum wheel torque may be adjusted to a value of zero to ensure that the creep wheel torque request is the greater of the torques.

In the second phase 304, vehicle speed is greater than vehicle creep speed and less than vehicle creep speed plus an offset vehicle speed. During the second phase, the smooth transition wheel torque as shown in the third plot from the top of FIG. 3 is greater than the powertrain capable minimum wheel torque 310, the creep wheel torque request 312, and the vehicle coasting wheel torque 316. The second or transition phase bridges differences between the creep wheel torque request 312 and the vehicle coasting drivability wheel torque 316. The smooth transition wheel torque is one of the dominant torques when the vehicle's propulsion pedal is applied from a fully released position. When the propulsion pedal is applied, the smooth transition torque is a reference torque for the lead-in region to generate the vertical axis of FIG. 2 from the horizontal axis. In addition, the smooth transition wheel torque is the dominant torque when vehicle operation transits from coasting to vehicle creep.

In the third phase 306, vehicle speed is greater than the vehicle creep speed plus the offset vehicle speed. During the third phase, the vehicle coasting drivability wheel torque as shown in the fourth plot from the top of FIG. 3 is greater than the powertrain capable minimum wheel torque 310, the smooth transition wheel torque 314, and the vehicle creep torque 312. The vehicle coasting drivability wheel torque is the dominant torque when the vehicle is coasting.

The vehicle coasting drivability wheel torque, powertrain capable minimum torque, creep wheel torque, and smooth transition wheel torque may be calibrated to provide the torque trajectories in the phases shown in FIG. 3. In other words, the parameters that are mentioned in the description of FIG. 4 may adjusted to provide the torque trajectories shown in FIG. 3.

It may be observed that the minimum wheel torque request follows the creep wheel torque request 312 in the first phase. Further, the minimum wheel torque request follows the smooth transition torque 314 in the second phase. The minimum wheel torque request also follows the vehicle coasting drivability wheel torque during the third phase if it is not constrained by the powertrain capable minimum wheel torque.

Figure 4:
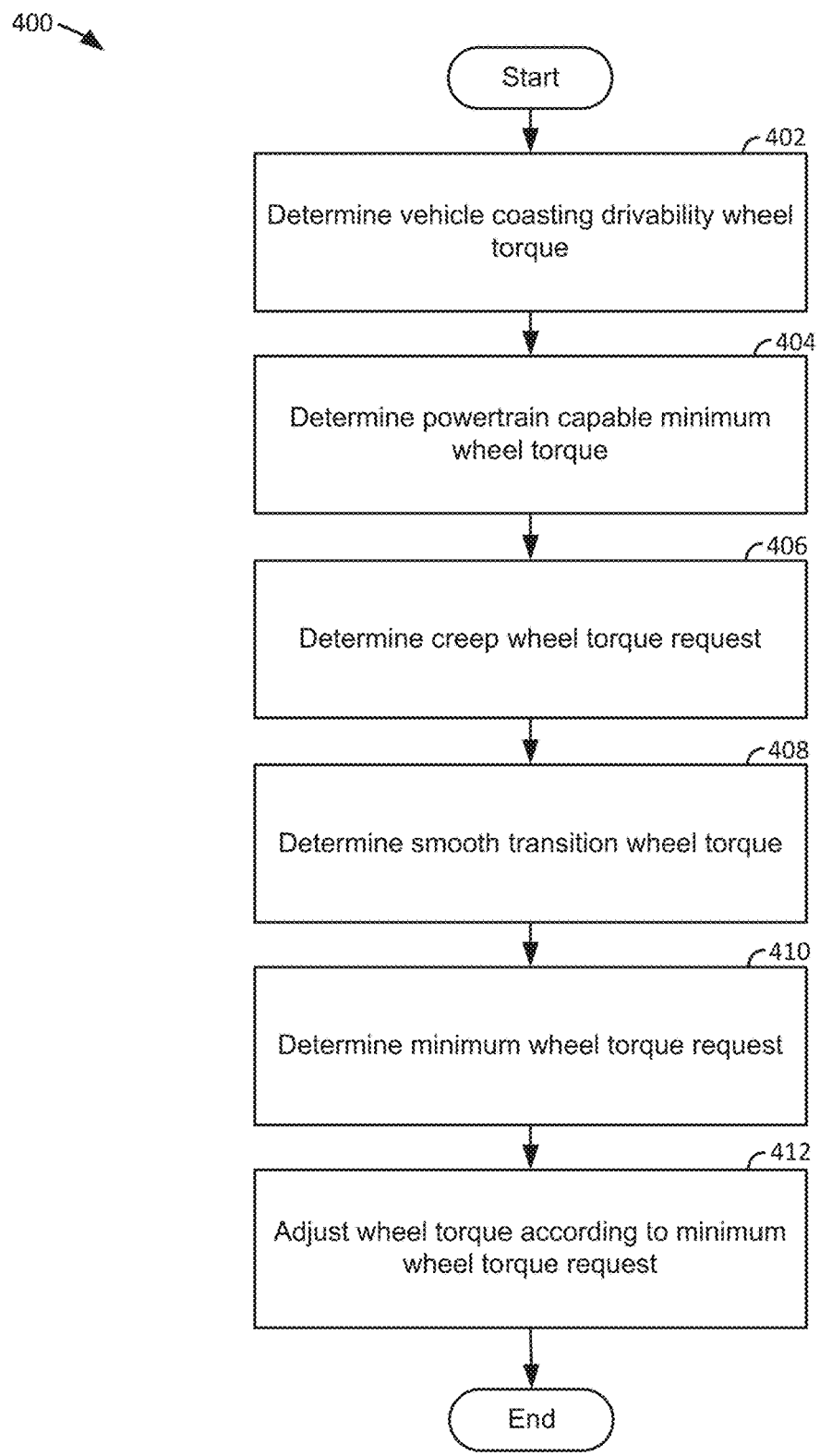
FIG. 4 shows an example method for determining and outputting the minimum requested wheel torque.

Referring now to FIG. 4, a method for determining a minimum wheel torque request is shown. The method of FIG. 4 may be included in the system of FIG. 1 as executable instructions stored in non-transitory memory. The method of FIG. 4 may operate in cooperation with the system of FIG. 1 to adjust operating states of devices (e.g., torque actuators) in the physical world.

At 402, method 400 determines vehicle coasting drivability wheel torque. The vehicle coasting drivability wheel torque is a wheel torque that causes vehicle speed to be reduced at a desired rate that conforms to customer metrics. The rate of vehicle speed reduction may be different for each vehicle drive mode. The vehicle coasting drivability wheel torque may be described via the following equations;

$$VSR_{DrvLimit} = f(vspd, rt_{tqTransm}, SDM)$$

$$Tq_{whlCoastDrv} = (VSR_{DrvLimit} \cdot Mass_{eff} + F_{drag}) \cdot R_{tire}$$

where $VSR_{DrvLimit}$ is a vehicle speed reduction limit that is not to be exceeded and desired to have during vehicle coasting, f is a function that returns the vehicle speed reduction limit, vspd is vehicle speed, $rt_{tqTransm}$ is the vehicle's transmission torque ratio, and SDM is the vehicle's selected drive mode (e.g., economy, performance, etc.), $Tq_{whlCoastDrv}$ is the vehicle coasting drivability wheel torque, $Mass_{eff}$ is the mass of the vehicle, $F_{drag}$ is the vehicle's drag force, and $R_{tire}$ is the vehicle's tire radius.

The function f in the vehicle speed reduction limit may be realized via tables holding adjustable values. For vehicles that include an electric machine propulsion source, the vehicle speed reduction limit may be adjusted to provide larger amounts of powertrain braking torque than an internal combustion engine.

The vehicle coasting drivability wheel torque may be provided via several different actuators depending on the vehicle configuration. For example, the deceleration torque may be generated via an engine and engine torque may be adjusted via a throttle, spark retard, fuel injector, and intake and exhaust poppet valve timing. For vehicles that include an electric machine propulsion source, the electric machine may be commanded to provide the vehicle coasting drivability wheel torque. Method 400 proceeds to 404.

At 404, method 400 determines the powertrain minimum wheel torque. The powertrain minimum wheel torque is a smallest value powertrain torque that may be commanded. In one example, the powertrain minimum wheel torque may be expressed via the following equation:

$$Tq_{whlPwrtrnMin} = \begin{cases} 0, & vspd < vspd_{creep} - cal \\ Tq_{whlEngFric} + Tq_{whlMtrMin}, & vspd \geq vspd_{creep} - cal \end{cases}$$

where $Tq_{whlPwrtmMin}$ is the powertrain capable minimum wheel torque, vspd is vehicle speed, $vspd_{creep}$ is the vehicle creep speed, cal is an vehicle speed offset amount, $Tq_{whlEngFric}$ is engine friction torque, $Tq_{whlMtrMin}$ is a minimum torque that may be provided via all electric machine powertrain propulsion sources (e.g., an electric machine that may provide propulsion force for a powertrain and there could be more than one electric machine equipped on the vehicle). Thus, the powertrain capable minimum wheel torque is zero when vehicle speed is less than vehicle creep speed minus an offset vehicle speed. The powertrain capable minimum wheel torque is the engine friction torque plus the minimum torque that may be provided via the electric machine powertrain propulsion source for vehicle speeds greater than or equal to vehicle creep speed minus the offset vehicle speed. The engine friction torque may be zero for electric vehicles and the minimum torque that may be provided by an electric machine propulsion source may be zero for powertrains that do not include an electric machine. Method 400 proceeds to 406.

At 406, method 400 determines the creep wheel torque request. In one example, method 400 may determine the creep wheel torque request via the following equations:

$$Tq_{whlCreepReq} = Tq_{tur} \cdot rt_{gb} \cdot rt_{fd}$$

$$Tq_{tur} = f\left(\frac{N_{idledes}}{Nt_{creep}}\right) \cdot (N_{idledes})^2 / K^2\left(\frac{N_{idledes}}{Nt_{creep}}\right)$$

$$Nt_{creep} = vspd_{creep} \cdot rt_{gb} \cdot rt_{fd}$$

where $Tq_{whlCreepReq}$ is the wheel torque creep request, $Tq_{tur}$ is torque converter turbine torque, $rt_{gb}$ is the transmission gear ratio, $rt_{fd}$ is the final drive or axle gear ratio, K is a torque converter capacity factor that is a function of a speed ratio $$\frac{N_{idledes}}{Nt_{creep}},$$

$N_{idledes}$ is the desired engine idle speed, and $Nt_{creep}$ is the torque converter turbine creep speed. For vehicles without a torque converter, e.g., an electric vehicle, the creep wheel torque request profile can be generated via different calculations (e.g., vehicle speed based calibration table) that once the torque request is provided by the powertrain, driver expected vehicle creep behavior can be met.

The wheel creep torque may be provided via the powertrain electric machine propulsion source, an engine, or a combination of the powertrain electric machine propulsion source and the engine. During vehicle conditions when a driver releases the brake pedal from vehicle stop, the vehicle does not reach creep speed immediately. However, the instantaneous or present vehicle speed may be used as the vehicle's creep speed to determine the wheel torque request. During conditions when a driver applies a propulsion pedal while the vehicle is at or below creep speed, then the wheel creep torque may be adjusted to a value that is less than the vehicle coasting drivability wheel torque. Method 400 proceeds to 408.

At 408, method 400 determines the smooth transition wheel torque. The smooth transition wheel torque may be determined via the following equations:

$$Tq_{whlSmTrans} = \begin{cases} Tq_{whlMinReqLast} + \frac{dTq_{whlRamp}}{dt} \cdot Time_{tipIn} \text{(following tip - in)} \\ Tq_{whlCreepReq} \text{(during creep)} \end{cases}$$

where $Tq_{whlSmTrans}$ is the smooth transition wheel torque, $Tq_{whlMinReqLast}$ is a minimum wheel torque request value immediately preceding a most recent application of a propulsion pedal (e.g., a tip-in) while the vehicle is moving at or below creep speed, $dTq_{whlRamp}/dt$ is an predetermined calibratable change rate of wheel torque and it is negative to control the ramp down rate of $Tq_{whlSmTrans}$, $Time_{tipIn}$ is the time duration after a tip-in event, $Tq_{whlCreepReq}$ is a wheel creep torque as calculated at 406. Thus, following a tip-in, the smooth transition wheel torque may be set to the minimum wheel torque request immediately preceding a most recent application of a propulsion pedal and may reduce with a controlled torque change rate. $Tq_{whlSmTrans}$ may be clipped by $Tq_{whlPwrtrnMin}$ when it drops to that negative level. However, while the vehicle is moving at or under creep speed, the smooth transition wheel torque may be set to the wheel creep torque request. Method 400 proceeds to 410.

At 410, method 400 determines the minimum wheel torque value. In one example, method 400 may determine the minimum wheel torque via the following equation:

$$Tq_{whlMinReq} = \max(Tq_{whlCoastDrv}, Tq_{whlPwrtrnMin}, Tq_{whlCreepReq}, Tq_{whlSmTrans})$$

where $Tq_{whlMinReq}$ is the minimum wheel torque request, max is a function that returns the greater of arguments input into the function, $Tq_{whlCoastDrv}$ is the vehicle coasting drivability wheel torque, $Tq_{whlCreepReq}$ is the in wheel creep torque request, $Tq_{whlPwrtrnMin}$ is the powertrain capable minimum wheel torque, and $Tq_{whlSmTrans}$ is the smoot transition wheel torque. Method 400 proceeds to 412.

At 412, method 400 adjusts a vehicle wheel torque according to the minimum wheel torque request. In one example, method 400 adjusts powertrain torque according to a relationship between a mapped driver demand wheel torque input and a commanded or requested driver demand wheel torque (e.g., as shown in FIG. 2). The relationship may include a lead-in region. The wheel torque in the lead-in region may include a minimum wheel torque. Method 400 adjusts torque output of a torque source (e.g., internal combustion engine or electric machine) to provide the minimum wheel torque request. For example, method 400 may adjust a throttle position, fuel injection timing, spark, and cam timing so that the engine delivers the minimum wheel torque request. Alternatively, or in addition, method 400 may adjust output of an electric machine via adjusting output of an inverter that supplies electrical current to the electric machine. Method 400 proceeds to exit after wheel torque request is adjusted by the minimum wheel torque request for zero or non-zero application of a propulsion pedal. The minimum wheel torque is delivered when there is zero propulsion pedal input (e.g., the propulsion pedal is not applied). Minimum wheel torque is not targeted to be delivered while it serves as a reference torque for wheel torque determination during the lead-in phase for a driver propulsion pedal tip-in (e.g., increasing propulsion pedal input).

Method 400 may generate consistent wheel torque during vehicle coasting conditions, vehicle creep condition, and transitions between vehicle coasting conditions and vehicle creep conditions irrespective of which one or more powertrain propulsion sources generates the consistent wheel torque. For example, method 400 may generate consistent wheel torque when a vehicle is coasting via an electric machine. Further, method 400 may generate the consistent wheel torque when the vehicle is coasting via an internal combustion engine and one or more electric machines. Likewise, method 400 may generate a consistent wheel torque when the vehicle is creeping solely via an electric machine, via an internal combustion engine and an electric machine, or via a plurality of electric machines. Further still, method 400 may generate consistent wheel torque when moving or transitioning from coasting to creeping or vice-versa solely via an electric machine, via an internal combustion engine and one or more electric machines.

Thus, the method of FIG. 4 provides for a method for operating a vehicle, comprising: generating consistent wheel torque during vehicle coasting conditions, vehicle creep condition, and transitions between vehicle coasting conditions and vehicle creep conditions irrespective which of one or more powertrain propulsion sources generates the consistent wheel torque. The method further comprises: selecting a minimum wheel torque from a plurality of torques; including the minimum wheel torque in a relationship between a mapped driver demand wheel torque and a driver demand wheel torque request; and adjusting torque of one or more powertrain propulsion source via a controller as a function of the relationship between the mapped driver demand wheel torque and the driver demand wheel torque request to generate the consistent wheel torque. The method includes where the one or more powertrain propulsion sources includes an internal combustion engine. The method includes where the one or more powertrain propulsion source includes an electric machine. The method includes where the minimum wheel torque is a maximum value of the plurality of torques. The method includes where the plurality of torques includes a vehicle coasting drivability wheel torque. The method includes where the plurality of torques includes a powertrain capable minimum wheel torque. The method includes where the plurality of torques includes a creep wheel torque request. The method includes where the consistent wheel torque is provided via more than one driveline configuration.

The method of FIG. 4 also provides for a method for operating a vehicle, comprising: adjusting a minimum wheel torque to a creep wheel torque request in a first phase; adjusting the minimum wheel torque to a smooth transition wheel torque in a second phase; adjusting the minimum wheel torque to a vehicle coasting drivability torque in a third phase; and adjusting torque of powertrain propulsion sources via a controller in response to the minimum wheel torque. The method includes where the first, second, and third phases are defined as a function of vehicle speed. The method includes where the second phase lies between the first phase and the second phase, and where the smooth transition wheel torque is a predetermined wheel torque rate of change. The method includes where the vehicle coasting drivability wheel torque is provided via one or more propulsion sources to deliver consistent vehicle deceleration during vehicle coasting.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for operating a powertrain, comprising:
one or more propulsion sources; and
a controller including executable instructions stored in non-transitory memory that cause the controller to adjust a torque of a propulsion source of the one or more propulsion sources in response to a minimum wheel torque request, where the minimum wheel torque request is a greater of a vehicle coasting drivability wheel torque, a powertrain capability minimum wheel torque, a smooth transition wheel torque, and a creep wheel torque, and where the smooth transition wheel torque is based on a past value of the minimum wheel torque request and a controlled calibratable wheel torque change rate.

2. The system of claim 1, where the one or more propulsion sources include an internal combustion engine.

3. The system of claim 2, where the one or more propulsion sources include an electric machine.

4. The system of claim 1, further comprising additional instructions to determine the creep wheel torque based on a torque converter characteristic, the torque converter characteristic being a function of a torque converter's speed ratio and a desired engine idle speed.

5. The system of claim 1, where the powertrain minimum wheel torque is zero for vehicle speeds less than a vehicle creep speed minus an offset vehicle speed, and it is the actual powertrain minimum capability from all propulsion sources projected to the wheel for vehicle speeds greater than a vehicle creep speed minus an offset vehicle speed.

6. The system of claim 1, where the vehicle coasting drivability wheel torque is based on transmission gear ratio, vehicle speed, and selected drive mode.

* * * * *